United States Patent
Dierke

(10) Patent No.: US 6,192,188 B1
(45) Date of Patent: *Feb. 20, 2001

(54) PROGRAMMABLE AUDIO/VIDEO ENCODING SYSTEM CAPABLE OF DOWNLOADING COMPRESSION SOFTWARE FROM DVD DISK

(75) Inventor: Gregg Dierke, San Jose, CA (US)

(73) Assignee: LSI Logic Corporation, Milpitas, CA (US)

(*) Notice: Under 35 U.S.C. 154(b), the term of this patent shall be extended for 0 days.

This patent is subject to a terminal disclaimer.

(21) Appl. No.: 08/954,136

(22) Filed: Oct. 20, 1997

(51) Int. Cl.[7] .............................. H04N 5/92; H04N 5/781
(52) U.S. Cl. .............................. 386/95; 386/111; 386/125
(58) Field of Search .............................. 386/45, 125–126, 386/4, 95, 111; 369/47–48, 54, 32; 348/416; 395/600

(56) References Cited

U.S. PATENT DOCUMENTS

| | | | |
|---|---|---|---|
| 5,150,339 | * 9/1992 | Ueda et al. | 369/32 |
| 5,231,487 | * 7/1993 | Hurley et al. | 386/12 |
| 5,576,757 | * 11/1996 | Roberts et al. | 348/207 |
| 5,915,018 | * 6/1999 | Aucsmith | 380/4 |
| 5,973,742 | * 10/1999 | Gardyne et al. | 348/416 |

\* cited by examiner

Primary Examiner—Thai Tran

(57) ABSTRACT

A programmable audio/video encoder capable of receiving an encoding algorithm from an external digital information source. In one embodiment, the system accepts recordable DVD disks having a read-only sector for storing customized video encoding algorithms and programs the programmable video encoder with the customized video encoding algorithms prior to encoding and recording a video signal on the disk. By designing the video encoding algorithms to optimize one or more of a number of desirable attributes, the DVD media vendors can then create "classes" of recordable DVD disks, i.e. high capacity, high quality, high speed, high image detail, high color resolution, variable frame rate, etc. One programmable video encoder for this embodiment would include an instruction memory for storing the customized video algorithms, a video buffer for buffering the video signal, and a CPU which encodes the video signal according to the customized video algorithms.

12 Claims, 2 Drawing Sheets

PROGRAMMABLE AUDIO/VIDEO ENCODING SYSTEM CAPABLE OF DOWNLOADING COMPRESSION SOFTWARE FROM DVD DISK

BACKGROUND OF THE INVENTION

1. Field of the Invention

This invention relates to the field of video compression systems, and in particular to programmable DVD video encoders.

2. Description of the Related Art

A video program signal is converted to a digital format, and then compressed and encoded in accordance with one of several known compression algorithms or methodologies. This compressed digital system signal, or bitstream, which includes a video portion, an audio portion, and other informational portion, is then transmitted to a receiver. Transmission may be over existing television channels, cable television channels, satellite communications channels, and the like. A decoder is then typically employed at the receiver to decompress and decode the received system signal in accordance with the same compression algorithm used to encode the signal. The decoded video information may then be output to a display device, such as a television (TV) monitor.

Video compression and encoding is typically performed by a video encoder. The video encoder normally produces a compressed digital system signal that conforms to a recognized standard or specification agreed to among the senders and receivers of digital video signals. One such standard is DVD. It includes audio and video compression technologies, as well as provisions for other information streams. The video compression standard adopted by DVD was developed by the Moving Pictures Experts Group (MPEG). The MPEG standard concerns high-quality coding of possibly interlaced video, including high definition television (HDTV). A wide range of applications, bit rates, resolutions, signal qualities and services are addressed, including all forms of digital storage media, TV broadcasting and communications.

The MPEG standard, although it details the structure and syntax of the compressed bitstreams, does not provide complete system specifications. A nearly infinite number of bitstreams can be generated to represent an image sequence while conforming to the MPEG standard. Design considerations such as image preprocessing, motion estimation methods, the order of compressed frame types, bit-rate management, implementation complexity, coded image size, color space sampling, and field interleaving, all lead to different representations of the same image. It should be recognized that the different representations may have varying degrees of quality, both in terms of compression and accuracy, but they all conform to the MPEG standard. A somewhat lesser degree of freedom exists in the way a bitstream is decoded, but nevertheless exists. For example, note that some video degradation might be an acceptable tradeoff for reduced implementation complexity, or that the coded image characteristics (size, frame rate) might be incompatible with the display device and require some adjustments (scaling, pulldown). The MPEG standard carefully avoids addressing issues such as these, preferring instead to allow industries to "customize" encoder and decoder implementations to their best advantage.

Currently, the customization of the encoder and decoder implementations is performed by the system designers, primarily with a combination of hardware and proprietary microcode, and the displayed image quality thereby determined. One drawback of this approach is that the digital media vendors cannot easily "improve" image quality to distinguish themselves from their competitors, nor can they easily upgrade their systems to incorporate the latest compression advances. It is desirable to provide a method for DVD media vendors to participate in the encoder and decoder customization process to produce media classes that provide for optimized trade-offs (e.g. capacity vs. image quality), and in so doing provide better performances for specific applications.

SUMMARY OF THE INVENTION

The problems outlined above are in large part solved by a digital audio/video recording system having a programmable video encoder capable of receiving an encoding algorithm from an external source. In one embodiment, the system accepts recordable DVD disks having a read-only sector for storing customized video encoding algorithms and programs the programmable video encoder with the customized video encoding algorithms prior to encoding and recording a video signal on the disk. By designing the video encoding algorithms to optimize one or more of a number of desirable attributes, the DVD media vendors can then create "classes" of recordable DVD disks, i.e. high capacity, high quality, high speed, high image detail, high color resolution, variable frame rate, etc. One programmable video encoder for this embodiment would include an instruction memory for storing the customized video algorithms, a video buffer for buffering the video signal, and a CPU which encodes the video signal according to the customized video algorithms. In a second embodiment, the system accepts CD-ROM disks having customized audio/video algorithms and automatically downloads the customized algorithms to use for encoding and recording digital audio/video signals.

Broadly speaking, the present invention contemplates a programmable video encoding system comprising a read head, a video encoder, and a channel coding and modulation circuit. The read head is configured to read a video encoding algorithm from a read-only sector on a digital information storage medium. The video encoder is operatively coupled to the read head to receive and store the video encoding algorithm. The video encoder is configured to receive a video signal and configured to execute the video encoding algorithm on the received video signal to produce an encoded digital video signal. The channel coding and modulation circuit is operatively coupled to receive the encoded digital video signal and configured to convert the encoded digital video signal into a modulated digital signal. The video encoder may include an instruction memory, a video buffer, and a CPU. The system may be configured to read and execute the video encoding algorithm from the read-only sector of the digital information storage medium every time the digital information storage medium is engaged in an operative relationship with the read head. The system may also include a record head operatively coupled to the channel coding and modulation circuit to receive the modulated digital signal and configured to record the modulated digital signal on a recordable digital information storage medium.

The present invention further contemplates a method for recording a digital video program of a predetermined caliber. The method comprises: (i) creating a recordable digital information storage medium with a read-only sector; (ii) storing a video encoding algorithm in the read-only sector; and (iii) placing the recordable digital information storage medium in a video recording system. The video encoding algorithm is designed to yield recordings of the predetermined caliber. The method may further comprise: (iv) reading the video encoding algorithm; (v) receiving a video signal; (vi) executing the encoding algorithm to convert the video signal into an encoded digital signal; and (vii) recording the encoded digital signal in the recordable digital information storage medium.

BRIEF DESCRIPTION OF THE DRAWINGS

Other objects and advantages of the invention will become apparent upon reading the following detailed description and upon reference to the accompanying drawings in which.

Figure 1:
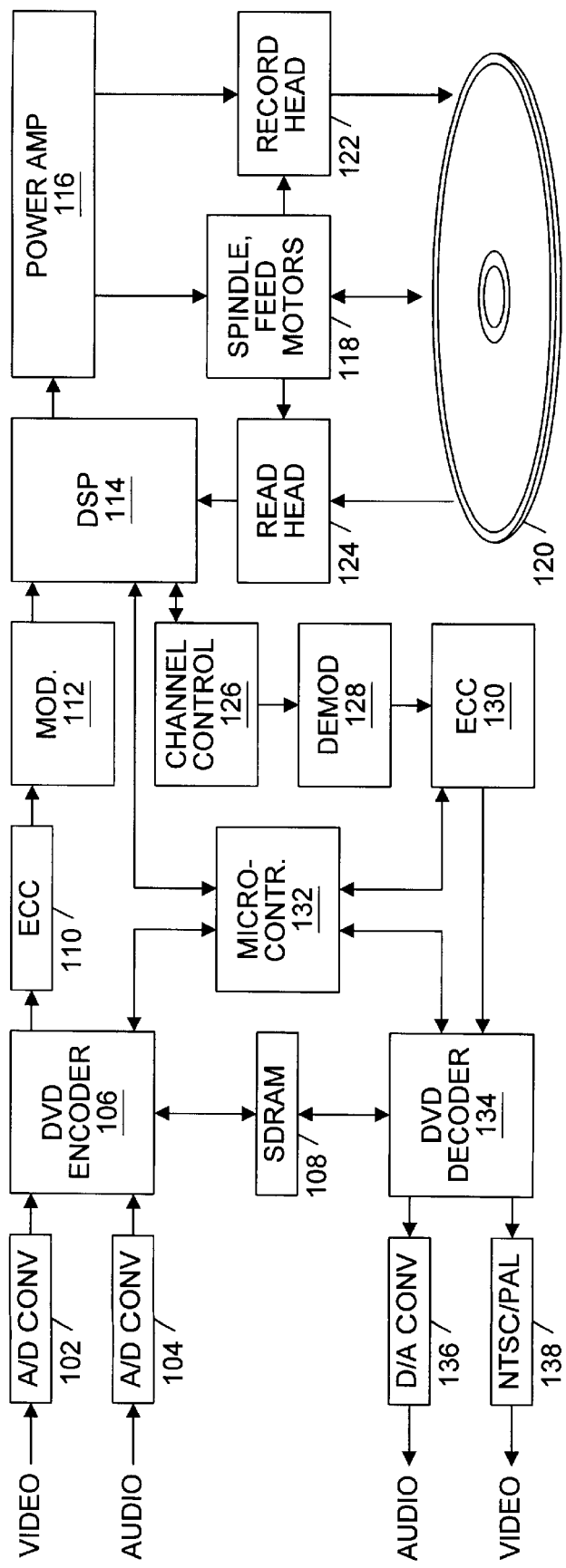
FIG. 1 is a block diagram of a programmable digital video record and playback system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the figures, FIG. 1 provides a block diagram of a programmable digital video record and playback system which can accept recordable DVD disks having a read-only sector with a video encoding algorithm. The system is configured to read the video encoding algorithm and execute the algorithm when encoding video signals for storage on the recordable DVD disks. This system allows for the use of various classes of recordable DVD disks in which each class is targeted for recording digital video signals of a given type (i.e. long play, high resolution, superior color, etc.)

The system receives audio and digital signals which are converted to digital signals by analog-to-digital (A/D) converters 102 and 104. The digital signals are encoded by a DVD encoder 106 which uses synchronous dynamic random access memory (SDRAM) 108 as a frame store buffer. The encoded digital signals are processed by an error correction encoder 110 then converted to a modulated digital signal by modulator 112. The modulated digital signal is coupled to a digital signal processor (DSP) 114 and from there to a power amplifier 116. Amplified signals are coupled to drive motors 118 to spin a recordable DVD disk 120 and a record head 122 to store the modulated digital signal on the recordable DVD disk 120. Stored data can be read from the recordable DVD disk 120 by read head 124 which sends a read signal to DSP 114 for filtering. The filtered signal is coupled to channel control buffer 126 for rate control, then demodulated by demodulator 128. An error correction code decoder 130 converts the demodulated signal into either a video encoding algorithm for DVD encoder 106, or an encoded video signal which is then decoded by DVD decoder 134 and converted to analog audio and video signals by digital-to-analog (D/A) converters 136 and 138. A microcontroller 132 coordinates the operations of the system components and loads the video encoding algorithm into the DVD encoder 106.

A/D converter 102 operates to convert an analog video signal into a digital video signal. This is likely to be the case for an analog video camera or videocassette playback recording. Digital cameras and computer generated graphics produce digital video signals. If a digital video signal is being received, the A/D converter 102 may be bypassed. Similarly, A/D converter 104 operates to convert an analog audio signal into a digital audio signal. Microphones and analog TV broadcasts are sources of analog audio signals. Examples of digital audio sources are compact disks and digital audio cassettes. For digital audio sources, the AID converter 104 may be bypassed.

DVD encoder 106 operates to encode the digital audio and video signals to produce an encoded digital signal. DVD encoder 106 is preferably a programmable encoder able to execute software video encoding algorithms. The operation and structure of the DVD encoder 106 is discussed further below.

Error correction encoder 110 and modulator 112 operate to provide channel coding and modulation for the encoded digital signal. Error correction encoder 110 may be a Reed-Solomon block code encoder, which provides protection against errors in the read signal. The modulator 112 converts the error correction coded output into a modulated signal suitable for recording on DVD disk 120.

DSP 114 serves multiple functions. It provides filtering operations for write and read signals, and it acts as a controller for the read/write components of the system. The modulated signal provided by modulator 112 provides an "ideal" which the read signal should approximate. In order to most closely approximate this ideal, certain nonlinear characteristics of the recording process must often be compensated. The DSP 114 may accomplish this compensation by pre-processing the modulated signal and/or post-processing the read signal. The DSP 114 controls the drive motors 118 and the record head 122 via the power amplifier 116 to record the modulated signal on the DVD disk 120. The DSP 114 also controls the drive motors 119 and uses the read head 124 to scan the DVD disk 120 and produce a read signal.

The channel control buffer 126 provides buffering of the read signal, while demodulator 128 demodulates the read signal and error correction code decoder 130 decodes the demodulated signal. After decoding the demodulated signal, the error correction decoder 130 forwards the decoded signal in response to the microcontroller 132. If the microcontroller 132 indicates that the output is a video encoding algorithm, the output is forwarded to the microcontroller 132 for use in the DVD encoder 106. Otherwise the output is assumed to be an encoded digital signal and is forwarded to DVD decoder 134.

DVD decoder 134 operates to decode the encoded digital signal to produce digital audio and video signals. The operation and structure of DVD decoder 134 are discussed further below. The digital audio signal may be converted to an analog audio signal by D/A converter 136, and the digital video signal may be converted to an analog video signal by D/A converter 138. One specific instance of D/A converter 138 is a NTSC (National Television Standards Committee) standard or a PAL (Phase Alternation Line) standard encoder which converts the digital video signal into a raster scan signal for display on a monitor.

Figure 2:
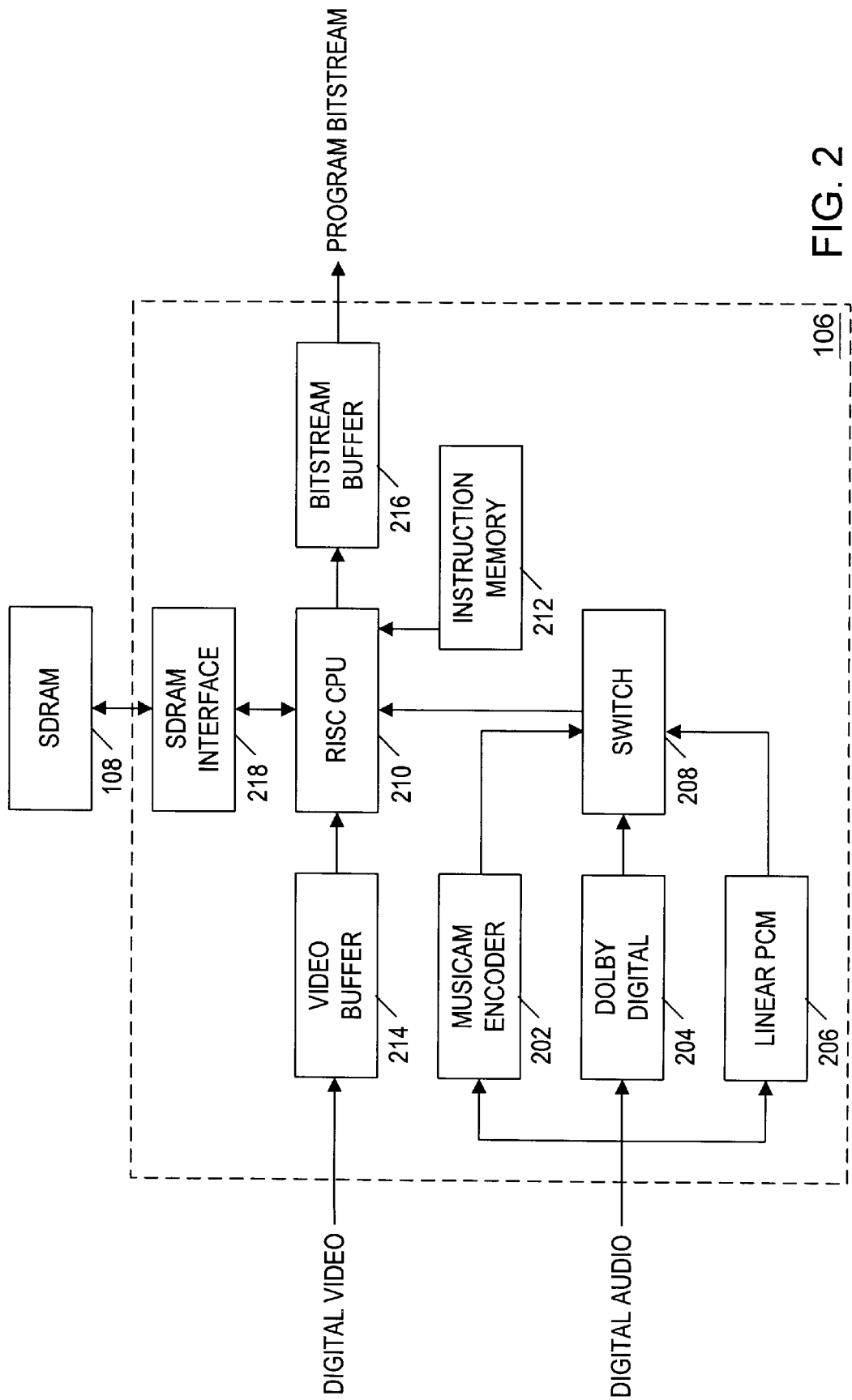
FIG. 2 is a block diagram of a programmable digital video encoder.

Turning now to FIG. 2, a block diagram of a programmable DVD video encoder 106 is shown. The digital audio signal may be compressed by one of three audio compression blocks: a MUSICAM encoder 202, a Dolby digital (AC3) encoder 204, or a Linear PCM encoder 206. A special purpose RISC CPU 210 accesses the appropriate audio encoder hardware to choose the audio compression method. The RISC CPU 210 operates on software stored in instruction memory 212, which can be loaded by microcontroller 132 via instruction interface 211. A video buffer 214 buffers the digital video signal while the RISC CPU 210 operates to convert the digital video signal into a compressed video signal to be combined with the compressed audio signal to form the encoded digital signal bitstream. A bitstream buffer 216 is used to buffer the encoded digital signal until it can be processed by the error correction encoder 110. The video compression process requires the use of frame buffers, and RISC CPU 210 uses SDRAM 108 via SDRAM interface 218 for this purpose.

In one embodiment, RISC CPU 210 relies on supporting video encoding hardware 208 to perform the low-level steps of the video encoding algorithm such as motion compensation and discrete cosine transform of macroblocks. The video encoding hardware 208 may be programmable via configuration registers to set the desired method of operation. The audio encoders 202, 204, and 206 may also be programmable and used in a supporting role. In this case, the RISC CPU 210 can also provide the high-level aspects of the audio compression algorithm. The steps of forming the bitstream syntax and interleaving the audio and video programs are performed by the RISC CPU 210.

RISC CPU 210, perhaps along with the supporting audio and video encoding hardware 208, compresses the audio and video signals using a software algorithm stored in instruction memory 212. The software algorithm may come from a variety of sources, including a system EEPROM. In particular, the software algorithm may be provided in a read-only sector on a recordable DVD disk 120. In one embodiment, the insertion of a recordable DVD disk 120 initiates a load sequence in which the software algorithm is read from the read-only sector of the recordable DVD disk 120 and stored in instruction memory 212. A subsequent initiation of a record sequence causes the system to use the loaded software algorithm for compressing any audio/video program it records on the recordable DVD disk 120.

To highlight customizable aspects of the video compression algorithm which the RISC CPU 210 executes, a general discussion of the steps which might be performed by a video MPEG encoder is now provided.

In order to compress a video signal, it is typically necessary to sample the analog data and represent this data with digital values of luminance and color difference. Video input is typically sampled at 4:2:2, where a red color difference signal (Cr) and a blue color difference signal (Cb) are sub-sampled 2-to-1 with respect to a luminance (Y) signal. The MPEG standard suggests that the luminance component Y of a video signal may be sampled with respect to the color difference signals Cr, Cb by a ratio of 4-to-1. That is, for every four samples of the luminance component Y, there is one sub-sample each of the color difference components Cr and Cb. A 4-to-1 sampling ratio is generally considered acceptable because the human eye is much more sensitive to luminance (brightness) components than to color components. For end users, video sub-sampling typically is performed 2-to-1 in both the vertical and horizontal directions (known as 4:2:0). However, the MPEG standard allows the use of other sampling ratios, and commercial studio-quality systems will often not vertically sub-sample the color difference components at all, i.e. maintain 2-to-1 horizontal only sampling ratios. A 3-to-2 sampling ratio has also been discussed for use in MPEG video compression.

Once the video signal is sampled, it is typically formatted into a non-interlaced signal that contains all of the picture content. More particularly, the video signal includes a plurality of pictures or frames, where each frame includes a plurality of horizontal scan lines for display. An interlaced signal, in contrast, is one that contains only part of the picture content for each complete display scan. In an interlaced signal, each frame is divided into two fields. The two fields are often referred to as the even and odd or the top and bottom fields. Each field spans the length of the frame, but only includes every other scan line. The purpose for such field division is that most TVs today display the video information in interlaced format, by displaying one field first, such as the entire top field, then displaying the entire bottom field. Note that although the non-interlaced frame format is common, interlaced field encoding is permitted under the MPEG-2 standard. It is possible that the interlaced field encoding may be more suitable for use with some low-cost video cameras.

After a video signal is sampled and formatted, the encoder may process it further by converting it to a different resolution in accordance with the image area to be displayed. A wide variety of picture resolutions are available, but a higher encoded resolution typically implies a higher bit rate and hence a smaller disk capacity.

The video encoder must next determine how to encode each picture. A picture may be considered as corresponding to a single frame of motion video, or to a single frame of a movie film. Different encoding schemes may be employed for each picture. The most prevalent picture coding types are: I-pictures (intra-coded pictures) which are coded without reference to any other pictures and are often referred to as anchor frames; P-pictures (predictive-coded pictures) which are coded using motion-compensated prediction from the past I- or P-reference picture, and may also be considered anchor frames; and B-pictures (bidirectionally predictive-coded pictures) which are coded using motion compensation from a previous and a future I- or P-picture. These picture types will be referred to as I, P or B frames.

A typical coding scheme may employ a mixture of I, P, and B frames. Typically, an I frame may occur every half a second, with two B frames inserted between each pair of I or P frames. I frames provide random access points within the coded sequence of pictures where decoding can begin, but are coded with only a moderate degree of compression. P frames are coded more efficiently using motion compensated prediction from a past I or P frame and are generally used as a reference for further prediction. B frames provide the highest degree of compression but require both past and future reference pictures for motion compensation. B frames are not used as references for prediction. The organization of the three picture types in a particular video sequence is very flexible. A fourth picture type is defined by the MPEG standard as a D-picture, or DC-picture, which is provided to allow a simple, but limited quality, Fast-Forward mode. Note that the mixture of frames is customizable, and that some higher compression may be attained by reducing the number of random-entry points in the bitstream. Conversely, better slow and fast, forward and reverse motion effects may be provided by sacrificing some compression and increasing the number of random entry point in the bitstream.

Once the picture types have been defined, the encoder may estimate motion vectors for each 16 by 16 macroblock in a picture. A macroblock (MB) is the basic coding unit for the MPEG standard. A macroblock consists of a 16-pixel by 16-line portion, or four 8-pixel by 8-line blocks, of luminance components (Y) and several spatially corresponding 8 by 8 blocks of chrominance components Cr and Cb. The number of blocks of chrominance values depends upon which particular format is used. Common color space sampling schemes include 4:4:4 for maximum quality but relatively low compression, 4:2:2 including two Cb chrominance blocks and Cr chrominance blocks, and 4:2:0 including one Cb chrominance block and one Cr chrominance block. A plurality of such macroblocks form a horizontal slice within a frame, where the slice is the basic processing unit in an MPEG coding scheme. A plurality of such slices form each picture or frame, which is the basic unit of display. As described previously, however, each frame is typically interlaced and displayed as two separate fields.

Motion vectors provide displacement information between a current picture and a previously stored picture. P frames use motion compensation to exploit temporal redundancy, or lack of substantial changes, between picture frames in the video. Apparent motion between sequential pictures is caused by pixels in a previous picture occupying different positions with respect to the pixels in a current macroblock. This displacement between pixels in a previous and a current macroblock is represented by motion vectors encoded in the MPEG bitstream. Typically, the encoder chooses which picture type is to be used for each given frame. Having defined the picture type, the encoder then estimates motion vectors for each macroblock in the picture. Typically in P frames, one vector is employed for each macroblock, and in B frames, one or two vectors are used. Note that the algorithm for determining motion vectors is completely customizable, and that "good" motion vector estimation is largely a matter of judgment. Different motion estimation techniques may be more suitable (i.e. result in better compression) for different film types (e.g. cartoons vs. action movies).

When the encoder processes B frames, it usually re-orders the picture sequence so that a video decoder receiving the digital video signal operates properly. Since B frames are usually coded using motion compensation based on previously sent I or P frames, the B frames can only be decoded after the subsequent anchor pictures (an I or P frame) have been received and decoded. Thus, the sequence of the series of pictures may be re-ordered by the encoder so that the pictures arrive at the decoder in a proper sequence for decoding of the video signal. The decoder may then re-order the pictures in proper sequence for viewing.

For a given macroblock of video data, the encoder is programmed to select a coding mode depending on the picture type, the effectiveness of motion compensation in the particular region of the picture, and the nature of the signal within the block. The criteria for making this selection are customizable. A coding method is selected, and the encoder begins to process the macroblocks accordingly. For I frames, the encoder performs a Discrete Cosine Transform (DCT) on the current macroblock. For P and B frames, the encoder first performs a motion-compensated prediction of the block contents based on past and/or future reference pictures. The encoder then produces an error signal by subtracting the prediction from the actual data in the current macroblock. The error signal is similarly separated into 8 by 8 blocks (four luminance blocks and two chrominance blocks for 4:2:0 encoding). A DCT is then performed on each block to achieve further compression. The DCT operation converts an 8 by 8 block of pixel values to an 8 by 8 matrix of horizontal and vertical coefficients of spatial frequency. An 8 by 8 block of pixel values can subsequently be reconstructed by a video decoder performing an Inverse DCT (IDCT) on the spatial frequency coefficients.

In addition to the signal compression that is achieved by the encoding process itself, a substantial degree of intentional (but lossy) signal compression can be achieved by a process of selecting a quantization step size, where the quantization intervals or steps are identified by an index. Considerable freedom is permitted in making the selection of quantization step sizes. The quantization level of frequency coefficients corresponding to the higher spatial frequencies favors the creation of coefficient values of zero by choosing an appropriate quantization step size based on the human visual perception system. In particular, the step size is chosen so that the human visual perception system is unlikely to notice the loss of a particular spatial frequency unless the coefficient value for that spatial frequency rises above the particular quantization level. The statistical encoding of the resulting runs of consecutive zeroed-valued coefficients corresponding to the higher-order coefficients accounts for considerable compression gain. Higher quantization values allow greater compression at the expense of quality, while lower values allow higher video quality at the expense of more bits.

In order to cluster non-zero coefficients early in the series and to encode as many zero coefficients as possible following the last non-zero coefficient in the ordering, the coefficient sequence is often organized in a specified orientation termed zigzag ordering. More than one method of zigzag ordering is possible. Zigzag ordering concentrates the highest (and least common) spatial frequencies at the end of the series. Once the zigzag ordering has been performed, the encoder performs "run-length coding" on the AC coefficients. This process reduces each 8 by 8 block of DCT coefficients to a number of events represented by a non-zero coefficient and the number of preceding zero coefficients. Because the high-frequency coefficients are more likely to be zero, the combination of zigzagging and run-length coding results in additional video compression.

The video encoder then performs variable-length coding (VLC) on the resulting data. VLC is a reversible lossless procedure for coding data that assigns shorter code words to frequent events and longer code words to less frequent events, thereby achieving additional video compression. Huffman encoding is a particularly well-known form of VLC that reduces the number of bits necessary to represent a data set without losing any information.

The final compressed video data is then ready to be transmitted to a storage device or over a transmission medium for reception and decompression by a remotely located decoder. The MPEG standard specifies a particular syntax for a compressed bitstream, and bitstreams which adhere to this standard can be decoded by MPEG-compliant decoders.

The video decoding process is generally the inverse of the video encoding process and is employed to reconstruct a motion picture sequence from a compressed and encoded bitstream. The data in the bitstream is decoded according to a syntax that is itself defined by the data compression algorithm. The decoder must first identify the beginning of a coded picture, identify the type of picture, then decode each individual macroblock within a particular picture. If there are motion vectors and macroblock types (each of the frame types I, P, and B have their own macroblock types) present in the bitstream, they can be used to construct a prediction of the current macroblock based on past and future reference frames that the decoder has already stored. The Huffman coded data are decoded and inverse zigzagged back into coefficient data. The coefficient data is then inverse quantized and operated on by an IDCT (inverse DCT) process so as to transform the macroblock data from the frequency domain to data in the time and space domain.

After all of the macroblocks have been processed by the decoder, the picture reconstruction is complete. If a reconstructed frame is a reference or anchor frame, such as an I or a P frame, it replaces the oldest stored anchor frame and is used as the new anchor for subsequent frames. As noted above, the frames may also need to be re-ordered before they are displayed in accordance with their display order instead of their coding order. After the frames are reordered, they may then be displayed on an appropriate display device.

The use of various algorithm sources other than a read-only sector on a recordable disk are contemplated. A separate, dedicated "algorithm disk" may be placed into the system and the encoding algorithms retrieved from it before the system records the on the recordable digital media. The system may be coupled to the internet to download customized encoding algorithms, or may be part of a set-top box coupled to receive digital television transmissions and configured to detect and download encoding algorithms provided as part of the transmission. Hence the encoding algorithms may be provided to the system via satellite or cable.

Numerous other variations and modifications will become apparent to those skilled in the art once the above disclosure is fully appreciated. For example, other customizable video encoding standards may be used, e.g. H.261, H.263, JPEG, and/or proprietary encoding methods, and use of these is contemplated. It is intended that the following claims be interpreted to embrace all such variations and modifications.

What is claimed is:

1. A programmable video encoding system comprising:
   a read head configured to read a video encoding algorithm from a read-only sector on a digital information storage medium;
   a video encoder operatively coupled to the read head to receive and store the video encoding algorithm, wherein the video encoder is configured to receive a video signal, and wherein the video encoder is configured to execute the video encoding algorithm on the received video signal to produce an encoded digital video signal; and
   a channel coding and modulation circuit operatively coupled to receive the encoded digital video signal and configured to convert the encoded digital video signal into a modulated digital signal,
   wherein the system is configured to read and execute the video encoding algorithm from the read-only sector of the digital information storage medium every time the digital information storage medium is configured in an operative relationship with the read head.

2. The programmable digital video recording system of claim 1, wherein the video encoder includes:
   an instruction memory coupled to receive and store the video encoding algorithm;
   a video buffer coupled to receive and store the video signal; and
   a CPU coupled to the instruction memory to retrieve instructions and coupled to the video buffer to retrieve the video signal, wherein the CPU is configured to execute the video encoding algorithm on the video signal.

3. The programmable digital video recording system of claim 1, wherein the system is configured to read and execute the video encoding algorithm from the read-only sector of the recordable digital information storage medium every time the recordable digital information storage medium is configured in an operative relationship with the read and record heads.

4. The programmable digital video recording system of claim 1, wherein the channel coding and modulation circuit includes:
   an error correction encoder coupled to receive the encoded digital video signal and configured to convert the encoded digital video signal to an error correction coded signal; and
   a modulator coupled to the error correction encoder to receive the error correction coded signal, wherein the modulator is configured to convert the error correction coded signal into the modulated digital signal.

5. A programmable video encoding system comprising:
   a read head configured to read a video encoding algorithm from a read-only sector on a digital information storage medium;
   a video encoder operatively coupled to the read head to receive and store the video encoding algorithm, wherein the video encoder is configured to receive a video signal, and wherein the video encoder is configured to execute the video encoding algorithm on the received video signal to produce an encoded digital video signal; and
   a channel coding and modulation circuit operatively coupled to receive the encoded digital video signal and configured to convert the encoded digital video signal into a modulated digital signal.

6. The programmable video encoding system of claim 5, wherein the video encoder includes:
   an instruction memory coupled to receive and store the video encoding algorithm;
   a video buffer coupled to receive and store the video signal; and
   a CPU coupled to the instruction memory to retrieve instructions and coupled to the video buffer to retrieve the video signal, wherein the CPU is configured to execute the video encoding algorithm on the video signal.

7. The programmable video encoding system of claim 5, wherein the channel coding and modulation circuit includes:
   an error correction encoder coupled to receive the encoded digital video signal and configured to convert the encoded digital video signal to an error correction coded signal; and
   a modulator coupled to the error correction encoder to receive the error correction coded signal, wherein the modulator is configured to convert the error correction coded signal into the modulated digital signal.

8. The programmable video encoding system of claim 5, further comprising a record head operatively coupled to the channel coding and modulation circuit to receive the modulated digital signal and configured to record the modulated digital signal on a recordable digital information storage medium.

9. A programmable digital audio recording system comprising:
   a read head configured to read an audio encoding algorithm from a read-only sector on a recordable digital information storage medium;
   an audio encoder operatively coupled to the read head to receive and store the audio encoding algorithm, wherein the audio encoder is configured to receive an audio signal, and wherein the audio encoder is configured to execute the audio encoding algorithm on the received audio signal to produce an encoded digital audio signal;

a channel coding and modulation circuit operatively coupled to receive the encoded digital audio signal and configured to convert the encoded digital audio signal into a modulated digital signal; and a record head operatively coupled to the channel coding and modulation circuit to receive the modulated digital signal and configured to record the modulated digital signal on the recordable digital information storage medium.

10. The programmable digital audio recording system of claim 9, wherein the audio encoder includes:

an instruction memory coupled to receive and store the audio encoding algorithm;

an audio buffer coupled to receive and store the audio signal; and a CPU coupled to the instruction memory to retrieve instructions and coupled to the audio buffer to retrieve the audio signal, wherein the CPU is configured to execute the audio encoding algorithm on the audio signal.

11. The programmable digital audio recording system of claim 9, wherein the system is configured to read and execute the audio encoding algorithm from the read-only sector of the recordable digital information storage medium every time the recordable digital information storage medium is configured in an operative relationship with the read and record heads.

12. The programmable digital audio recording system of claim 9, wherein the channel coding and modulation circuit includes:

an error correction encoder coupled to receive the encoded digital audio signal and configured to convert the encoded digital audio signal to an error correction coded signal; and a modulator coupled to the error correction encoder to receive the error correction coded signal, wherein the modulator is configured to convert the error correction coded signal into the modulated digital signal.

* * * * *